US007030336B1

(12) United States Patent
Hawley

(10) Patent No.: US 7,030,336 B1
(45) Date of Patent: Apr. 18, 2006

(54) METHOD OF FIXING ANODIC ARC ATTACHMENTS OF A MULTIPLE ARC PLASMA GUN AND NOZZLE DEVICE FOR SAME

(75) Inventor: David Hawley, Kings Park, NY (US)

(73) Assignee: Sulzer Metco (US) Inc., Westbury, NY (US)

(*) Notice: Subject to any disclaimer, the term of this patent is extended or adjusted under 35 U.S.C. 154(b) by 0 days.

(21) Appl. No.: 10/731,9864

(22) Filed: Dec. 11, 2003

(51) Int. Cl.
*B23K 10/00* (2006.01)

(52) U.S. Cl. ........................... 219/121.51; 219/121.52; 219/121.49; 219/75

(58) Field of Classification Search ........... 219/121.36, 219/121.5, 121.51, 121.52, 121.47, 76.15, 219/76.16, 75, 121.48; 315/111.21–111.51
See application file for complete search history.

(56) References Cited

U.S. PATENT DOCUMENTS

| | | | | |
|---|---|---|---|---|
| 3,597,650 | A * | 8/1971 | Anderson et al. | 315/111.11 |
| 5,298,835 | A * | 3/1994 | Muehlberger et al. | 315/111.21 |
| 5,901,551 | A * | 5/1999 | Butler | 60/203.1 |
| 6,114,649 | A * | 9/2000 | Delcea | 219/121.52 |
| 2003/0201257 | A1* | 10/2003 | Crawmer | 219/121.47 |

* cited by examiner

*Primary Examiner*—Mark Paschall
(74) *Attorney, Agent, or Firm*—Hogan & Hartson L.L.P.

(57) ABSTRACT

An improved anode element for a plasma generator is comprised of an anode body having a central bore therein. A plurality of arc attachment regions are formed along a surface of the central bore. Each attachment is configured to provide a substantially radially predefined attachment point for an electrical arc extending between the attachment region and a respective cathode when the anode element is used in a plasma generator. The arc attachment points can be areas along the central bore which are elevated or proud relative to adjacent areas. The attachment points can also be defined at least in part by asymmetrical cooling of the anode.

36 Claims, 7 Drawing Sheets

METHOD OF FIXING ANODIC ARC ATTACHMENTS OF A MULTIPLE ARC PLASMA GUN AND NOZZLE DEVICE FOR SAME

FIELD OF THE INVENTION

The present invention is directed to an improved multiple arc plasma torch and nozzle assembly.

BACKGROUND

A plasma gun or torch is a device used to apply spray coatings at high temperatures and velocities to a surface. A conventional plasma gun is comprised of generally tubular channel with a cathode assembly at one end and an anode assembly at the other. When a sufficiently high voltage is applied across the anode and cathode, an electric arc is generated. Gas is fed into the chamber at one end and is heated by the arc to form a plasma. An exit nozzle is provided at the other end of the chamber to direct the plasma. The powder to be sprayed is injected into the plasma stream. The powder is heated and accelerated by the plasma and can be sprayed onto a surface to be coated. By controlling the voltage and the rate of gas flow, the amount of heating and velocity of the generated plasma, and thus the temperature and spray velocity of the powder, can be adjusted.

A general objective for plasma spray guns is to provide uniform heating and acceleration for as much of the injected powder as possible. When powder particles experience same heating and acceleration conditions, the resulting coating is more uniform. As variations are introduced into the temperature and velocity of the powder, defects in the coating can result, reducing the overall effectiveness of the coating. In addition, by providing uniform heating and acceleration, the efficiency at which powders are deposited is increased.

The plasma arc will generally attach to various points on the anode, where the specific attachment point depends on the lowest energy path between the cathode and the anode. In order to reduce erosion of the anode by the plasma arc, many spray guns use multiple arcs. For example, the plasma gun design disclosed in U.S. Pat. No. 5,406,046 uses three cathodes to produce three arcs which attach to different fixed points on a circular anode. Compared to a single arc, the current flow in each of the three arcs is reduced to one-third and the erosion of anode is reduced to one-ninth.

With reference to FIGS. 1A and 1B, the output of a three arc plasma gun 10 is a three plume plasma structure 12. In a one-plume structure, the powder injection velocity must be controlled to place the powder in the center of plume without under or overshooting. In a three plume structure, as shown in FIGS. 1A and 1B, the powder injectors 14 are preferentially arranged so that powder 16 is injected directly between two adjacent plumes 12*a*, 12*b* and towards the third 12*c*, as shown in FIG. 1B. This produces a caging effect that directs the powder into the desired central area between the three plumes.

The gas passing through the gun is typically swirled, as shown in FIG. 1A, to permit more uniform heating of the gas by the arcs. The electrical arcs generally follow the path of heated gas and, therefore, the swirling gas changes the position of the arc attachment points on the anode and, consequentially, the position of the plasma plumes. The amount of change is dependent on the mass and velocity of the gas within the chamber as well as variations in current flow. Because these parameters can vary, and indeed are typically selectable by a user, the location of the plumes does not have a fixed relationship to the body of the gun. Instead, the arcs and corresponding plumes establish themselves in a stable zone according to the instantaneous operating conditions, such as the gas mass flow and the amperage of the current flow.

As will be appreciated, as the position of the plasma plumes change, the optimal injection points also change. With reference to FIG. 1B, a conventional solution is to provide a plasma gun 10 that has powder injector assemblies 12 with radial positions that are adjustable relative to the position of the plasma plumes. For example, the powder injectors can be mounted onto a rotatable injection ring 18. The ring 18 can then be adjusted each time the operating conditions of the gun change to place the powder injectors in the optimal position.

One drawback with this solution is that the positioning not always accurate. In addition to human error and mechanical imprecision, there are also random fluctuations in power and/or input gas flow that will cause wandering of the arc attachment points and subsequent misalignment of the injectors. Because the misalignment affects the temperature and velocity of the applied powder, the changes can result in inconsistent coatings being applied as the position of the injection relative to the plasma plumes varies. In addition, the deposit efficiency can be also be reduced. Since the powder is typically the most expensive component of the coating process, even small changes in deposit efficiency can have non-trivial economic impact.

It is an object of the present invention to provide an improved plasma generator with an anode element that provides arc attachment points that remain radially fixed even as the operating conditions of the gun change.

It is a further object of the invention to provide a plasma generator with an anode element wherein the arc attachment points can vary along respective generally longitudinal axes.

SUMMARY OF THE INVENTION

These and other objects are achieved by providing a plasma generator with a plasma channel that has a plurality of cathodes positioned at a one end of the plasma channel and arranged radially about a central axis of the channel. An anode element with a central bore is positioned at the other end of the channel. In accordance with the invention, the anode element has a plurality of arc attachment regions along a surface of the central bore. Each attachment region corresponds to a respective cathode and is configured to provide a substantially radially predefined attachment point for an electrical arc extending between the attachment region and the respective cathode.

In a first embodiment, the arc attachment regions each comprise an elevation of the surface of the central bore towards the central axis. Each elevation is arranged so it is closer to the corresponding cathode then the immediately surrounding areas. As a result, an arc from the corresponding cathode will preferentially attach to the elevation. Preferably, each elevation comprises a ridge that has upper surface relative to the central axis and which extends generally longitudinally.

The arc attachment point can move along the ridge as operating conditions change. This allows the arc length to vary in accordance with the changing operating conditions while still remaining at a radially fixed position. In addition, by allowing limited wandering, the erosive effects of the arc on the anode is spread, thereby increasing the lifetime of the anode.

Most preferably, the ridge is angled relative to the central axis. Angling the ridge increases the relative length of the arc attachment area. By increasing the area, the amount of thermal energy that can be transferred by the cooling system is also increased, allowing the gun to run hotter and/or last longer.

The arc attachment regions can be formed, in one methodology, by removing areas around the central bore where arc attachment is not wanted. For example, a series of overlapping circular cutouts can be machined around the central bore. The areas outward of the overlaps will be elevated relative to the surroundings and define arc attachment regions.

In a second embodiment, embodiment, a series of openings are formed along the periphery of the central bore and conductive pins, made of tungsten for example, are inserted into each of the openings. The openings and size of the pins are selected so that an exposed surface of the pin is proud relative to surrounding areas in the central bore. Similar to the ridge, the exposed portion of the pin provides the arc attachment region.

According to a further aspect of the invention, the anode element is configured so that the desired arc attachment regions are not cooled as quickly as the surrounding areas. The arcs will preferentially attach to the hotter areas. This non-uniform cooling can be achieved by various measures, such as adjusting the location of cooling tubes, and by placing thermal insulators at or near the regions where the arc attachments are desired. This can be used by itself or in combination with the features in the first and/or second embodiments.

Advantageously, because the radial position of the arc attachment points remains substantially fixed, even as the gas mass flow and the amperage of the current flow change, the position of the plasma plumes also remains fixed. As a result, powder can be injected under substantially ideal conditions. This eliminates the need to periodically adjust the radial position of the powder injectors as operating conditions change to obtain an optimal injection position.

In accordance with a further aspect of the invention, a plasma generator can be provided that has a plurality of powder injection ports arranged in a substantially fixed configuration with relation to the arc attachment regions. In a particularly advantageous embodiment, the powder injection ports and the anode element can be formed as an integral member. This ensures proper alignment of the injection ports relative to the position of the plasma plumes and also reduces the number of parts in the gun, thereby improving reliability and reducing cost.

BRIEF DESCRIPTION OF THE FIGURES

The foregoing and other features of the present invention will be more readily apparent from the following detailed description of illustrative embodiments of the invention in which.

DETAILED DESCRIPTION OF THE PREFERRED EMBODIMENTS

Figure 1B:
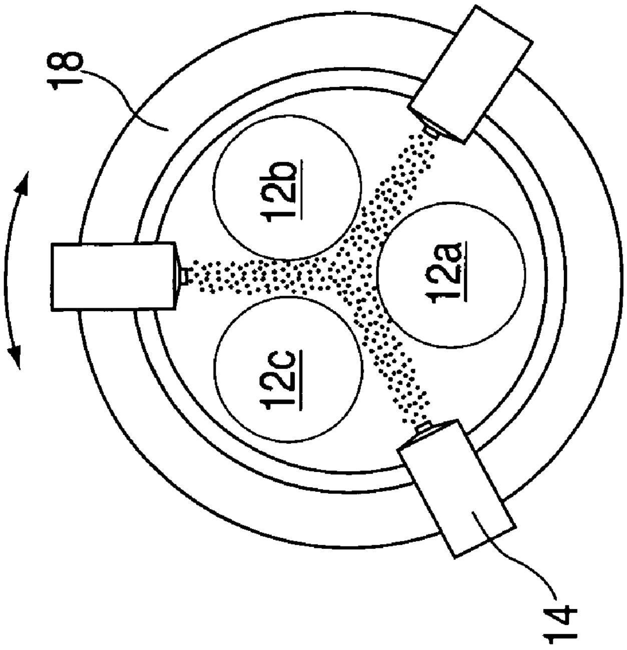
FIG. 1B PRIOR ART
FIGS. 1A and 1B illustrate a conventional three plume plasma jet in a perspective and front view, respectively.
Figure 1A:
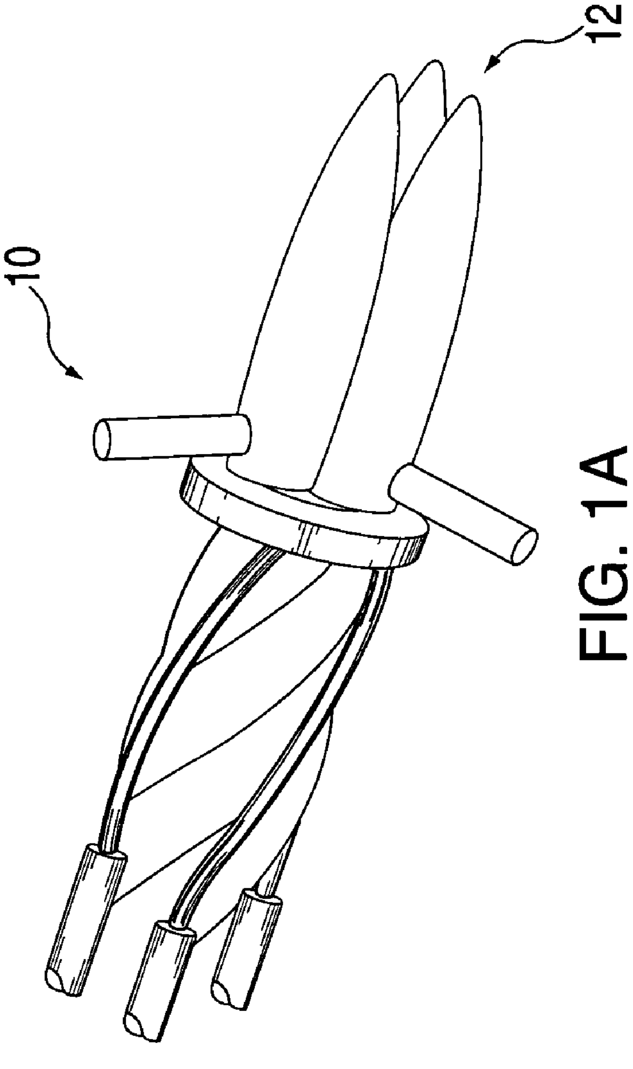
FIG. 1A PRIOR ART
Figure 2A:
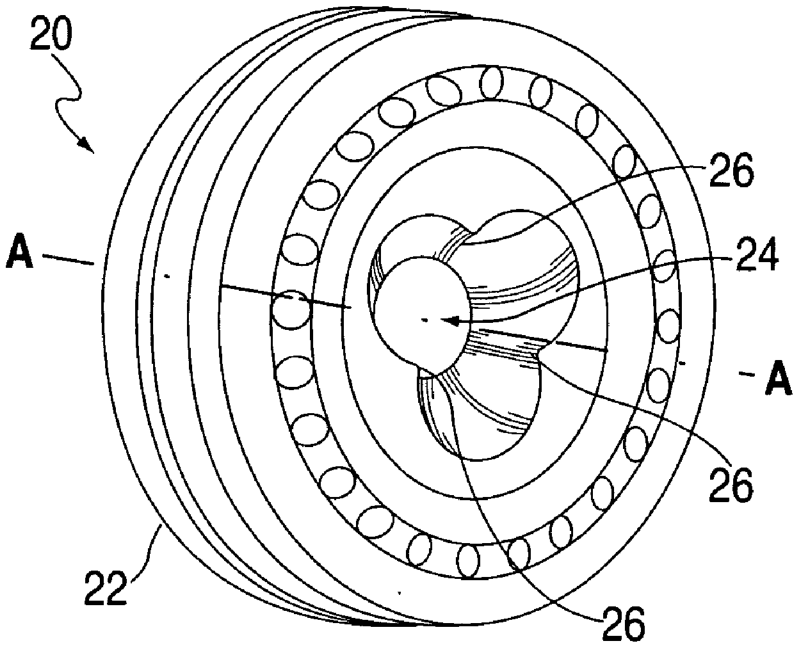
FIGS. 2A and 2B show a perspective and cut-away view of an anode with radially fixed arc attachment points according to a first embodiment of the invention.
Figure 2B:
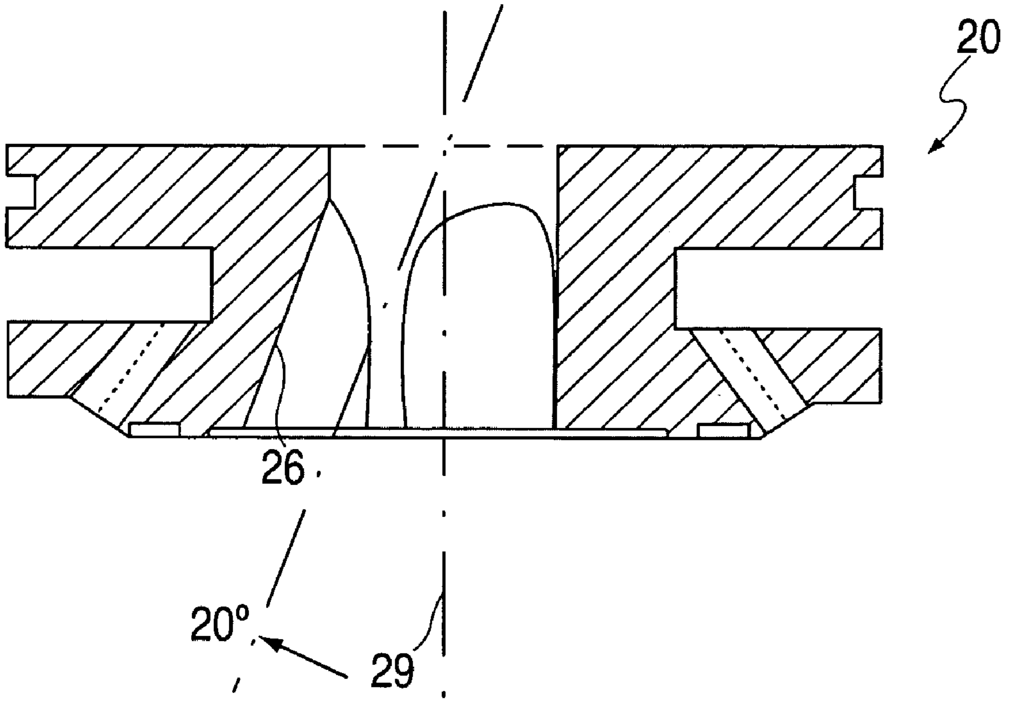

FIG. 2A shows a perspective view of an anode with radially fixed arc attachment points according to a first embodiment of the invention 20. FIG. 2B shows a cut-away view of the anode in FIG. 2A along line A—A. With reference to FIGS. 2A and 2B, an anode element 22 has a central bore 24 in which are formed a plurality of arc attachment regions 26. Preferably, there are an odd number of arc attachment regions, which (with corresponding cathode elements in a plasma gun), will result in an equal number of plasma plumes. Odd numbers of plumes allow powder to be easily injected between two plumes and directly towards a third. Most preferably, three arc attachment regions are formed.

As illustrated, the anode element 20 is preferably a unitary element and the arc attachment regions are preferably formed by removing overlapping generally circular cylindrical areas, preferably having equal diameter and spaced symmetrically around the central axis 29 of the central bore. The remaining surface surrounding the central bore has elevations that serve as arc attachment regions. Other fabrication methods, such as molding, can alternatively be used.

In a particular embodiment, the arc attachment areas 26 are not parallel to the central axis 29, but instead are angled thereto. This increases the length of each arc attachment region, and thereby its overall area. By increasing the area, amount of thermal energy that can be transferred by the cooling system is also increased, thereby allowing the gun to run hotter and/or last longer. Preferably, the angle is approximately 20 degrees.

Also shown in FIGS. 2A and 2B are cooling tubes or channels 27 through which a coolant can flow to remove heat from the anode. Because of the high operating temperature, adequate cooling is important to ensure that the anode has a reasonable operating lifetime. In this embodiment, the cooling tubes 27 are arranged along the periphery of the device. Other arrangements are also possible.

Preferably the surface of the central bore is made of tungsten, preferably in the form of a tungsten sleeve that can be inserted within the outer portion of the anode element. Most preferably, the outer portion of the anode element is formed of a electrical conductor with a high thermal conductivity, such as copper.

Figure 3A:
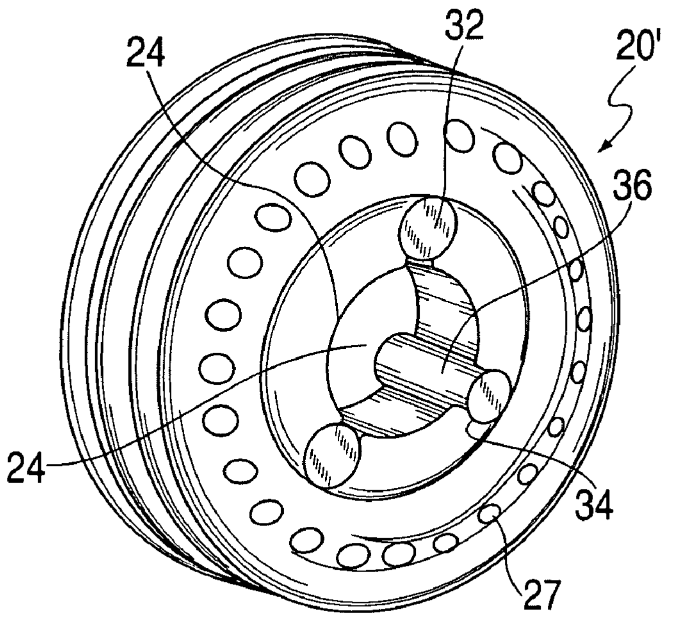
FIGS. 3A–3C show a perspective, front, and cut-away view of an anode with radially fixed arc attachment points according to a second embodiment of the invention.
Figure 3B:
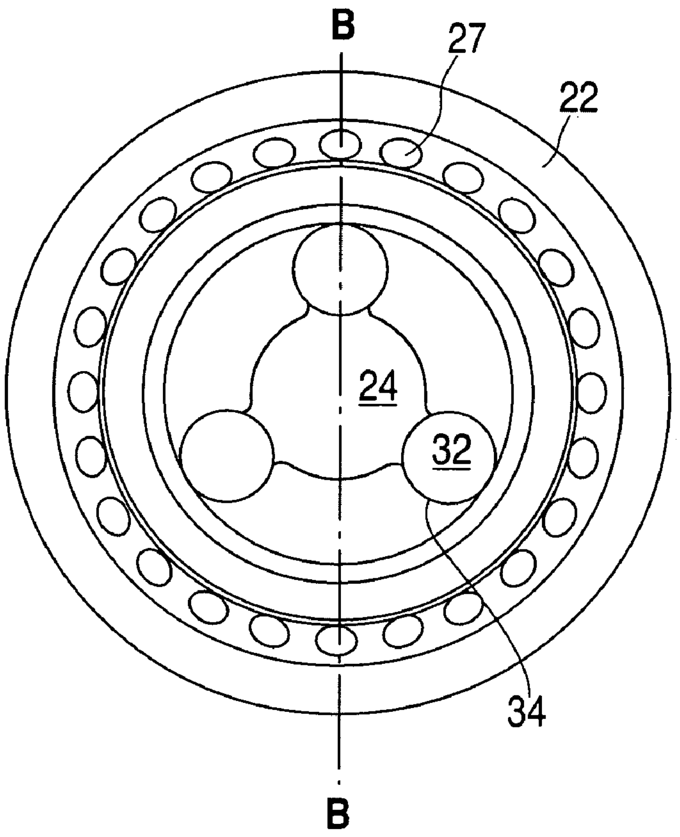

FIG. 3A shows a perspective view of an anode with radially fixed arc attachment points according to a second embodiment of the invention 20'. FIG. 3B shows a front schematic view of the anode of FIG. 3A, while FIG. 3C is a cut-away view of the anode of FIG. 3B along line B—B.

Figure 3C:
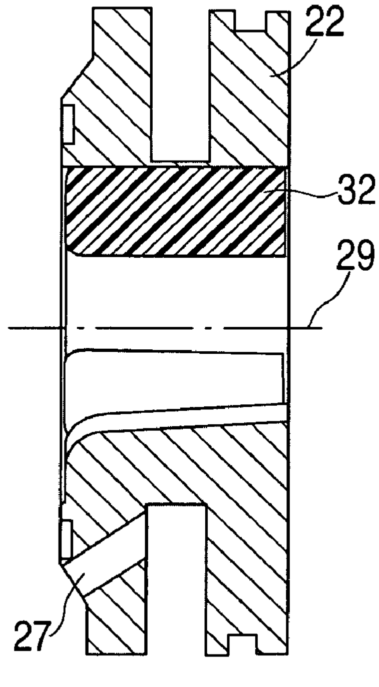

With reference to FIGS. 3A–3C, the anode 22 is configured similar to that in FIGS. 2A–2B, having a central bore 24 along axis 29 and a series of cooling tubes 27. In this embodiment, however, the arc attachment regions are formed by inserting a series of pins 32 into corresponding openings 34 along the periphery of the inner bore. As illustrated, the openings are configured so that a portion of the inserted pins are exposed to the inner bore and are proud relative to adjacent areas of the surface of the central bore. The exposed proud surface of each pin forms an arc attachment region 36. In a preferred configuration, the anode element is substantially comprised of copper and the pins are comprised of tungsten. The position of the pin can be arranged so that the exposed surface is generally parallel to the central axis 29, as shown in FIG. 3C, or tilted thereto. Preferably, the pins and the corresponding openings are tapered to provide a snug friction and ensure that each pin is inserted to the proper depth.

Figure 4:
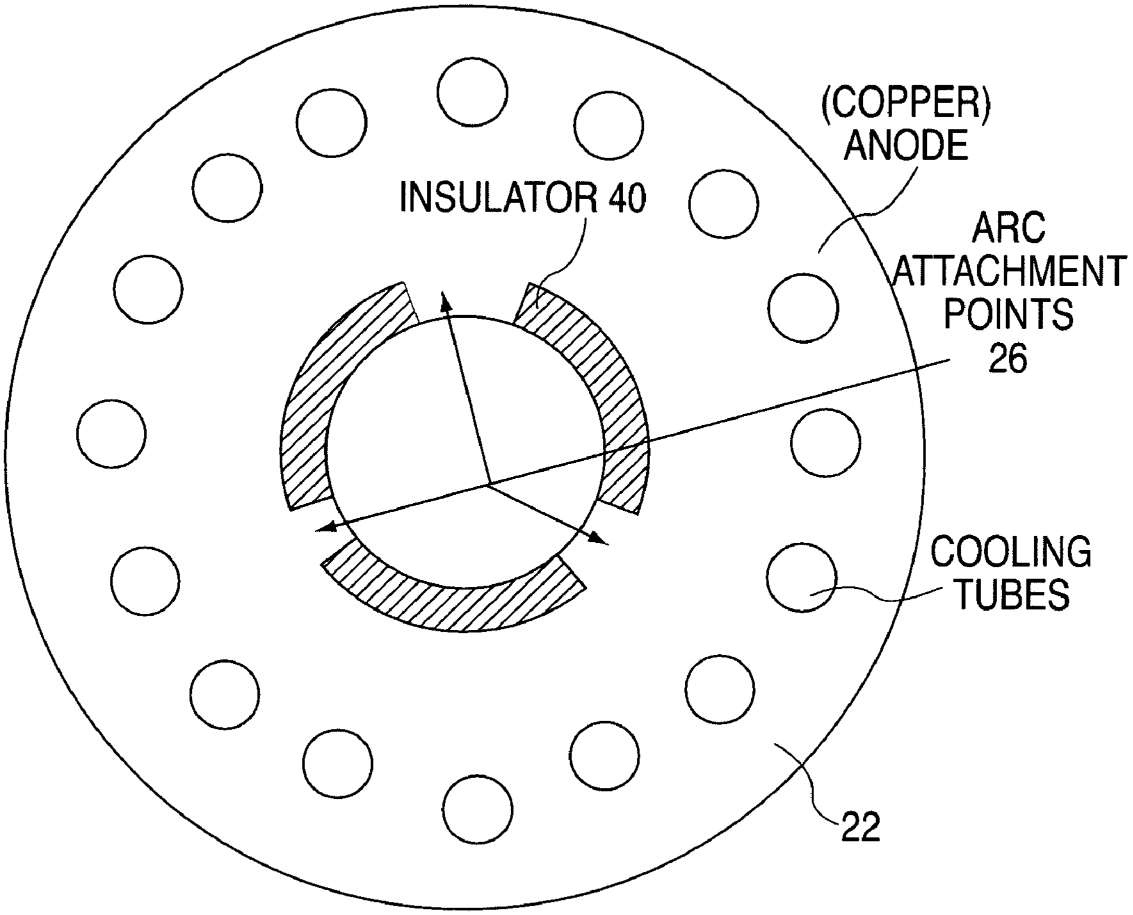
FIG. 4 shows a front view of an anode assembly according to a third embodiment of the invention.

A third embodiment of the invention is shown in FIG. 4. In this embodiment, regions of the central bore are lined with an electrical insulator 40. The desired arc attachment areas are left exposed. The arcs will attach to areas having lower resistivity and therefore will attach to the exposed areas as opposed to the areas which are insulated.

According to a fourth embodiment the invention, the arc attachment points are, at least in part, thermally defined. In particular, the internal structure of the anode and/or arrangement of cooling tubes are configured so that the areas within the central bore of the anode that are to serve as arc attachment regions run hotter or will be cooled more slowly than the adjacent regions as the arc will preferentially attach to areas that are hotter, and therefore have hotter gas at their surface.

This effect can be accomplished in various ways. In one implementation, the anode element is substantially comprised of a first electrically conductive material having a first thermal conductivity and the arc attachment regions comprise a second electrically conductive material having a second thermal conductivity less than the first thermal conductivity. For example, the first material can be copper and the second material can be tungsten. Most preferably, the tungsten regions are elevated relative to the adjacent areas to enhance the effect.

Figure 5:
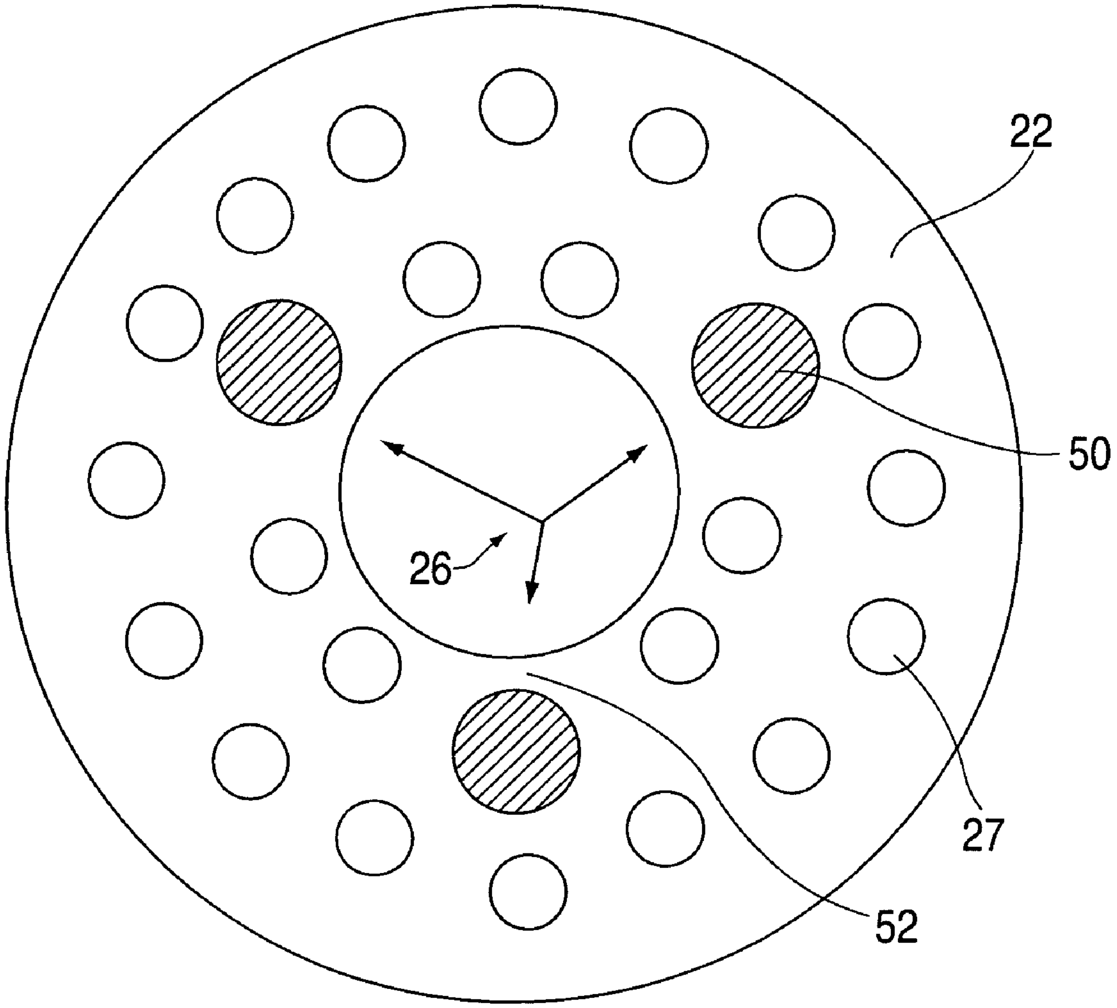
FIG. 5 shows a front view of an anode assembly according to a fourth embodiment of the invention wherein arc attachment points are thermally defined.

In another embodiment, shown in FIG. 5, thermally insulating regions 52 are formed within the body of the anode to reduce the relative thermal conductivity in the regions 26 where the arcs are to attach. This reduces the amount of heat that can be transferred from those areas 26, 52 and so allows them to run hotter relative to adjacent areas. As shown in FIG. 5, the distribution of the cooling tubes 27 can be adjusted so that there are fewer cooling tubes adjacent the arc attachment regions 26. Thermal insulating areas can be formed by using suitable inserts 50, as shown in FIG. 5, or by other means.

Figure 6:
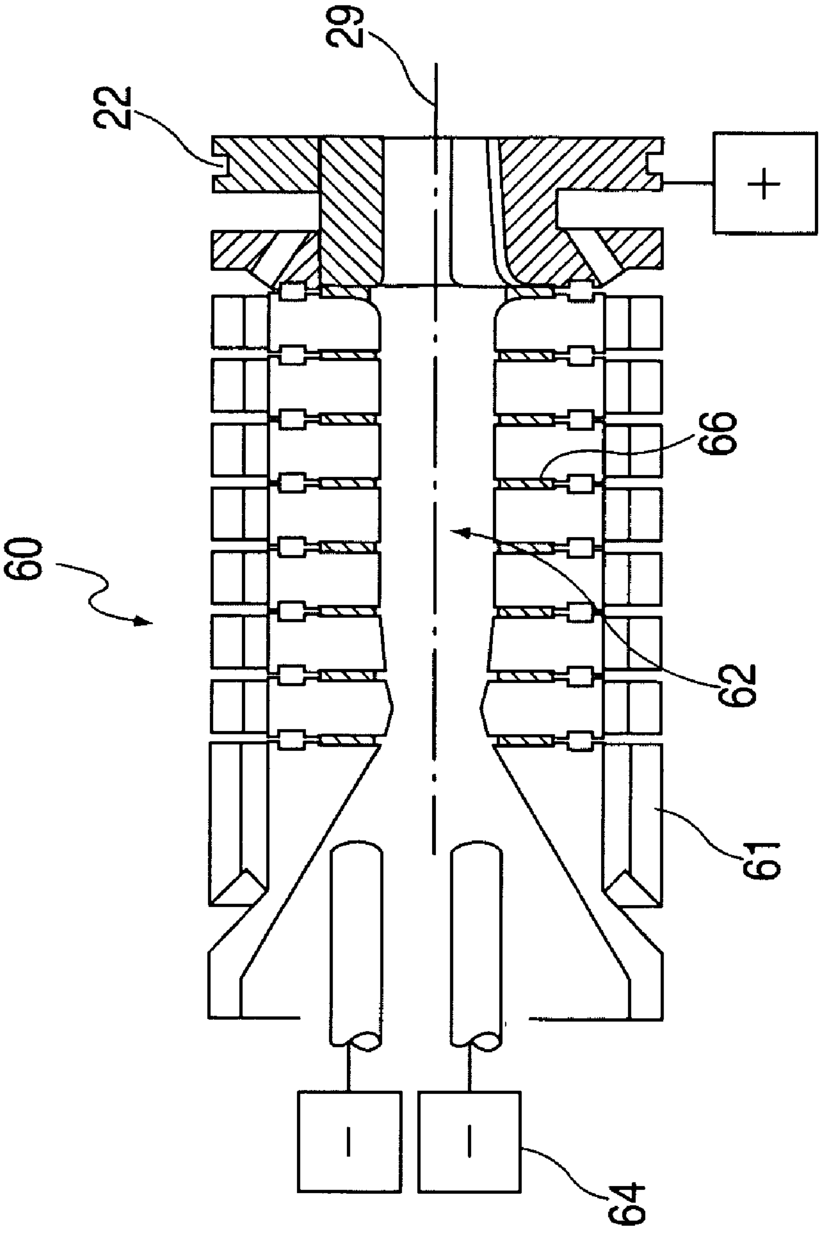
FIG. 6 is a cross-sectional illustration of a multi-cathode plasma gun having an improved anode configured according to aspects of the invention.

Turning to FIG. 6, there is shown a cross-sectional illustration of a multi-cathode plasma gun 60 having an improved anode configured according to the invention. The gun 60 has an improved anode 22 according to one of the embodiments of the invention at one end thereof and a plurality of cathodes 64 at the opposing end. A central bore 62 through which the arcs and gas will flow is formed in the body 61 of the gun 60. A series of neutrodes 66 are preferably formed along the length of body 61 as shown.

Figure 7A:
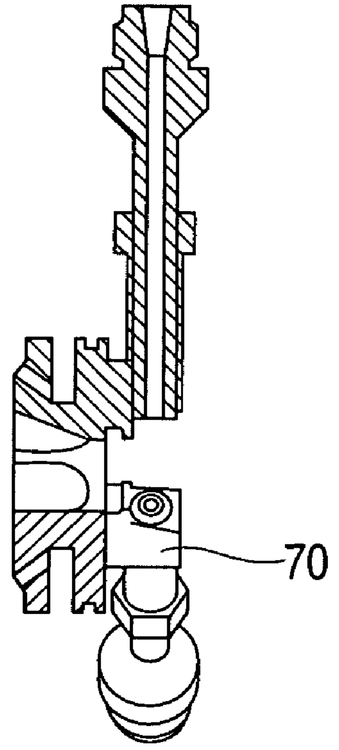
FIGS. 7A and 7B are side and top views, respectively, of an anode assembly having radially fixed arc attachment points and fixed location powder injectors.
Figure 7B:
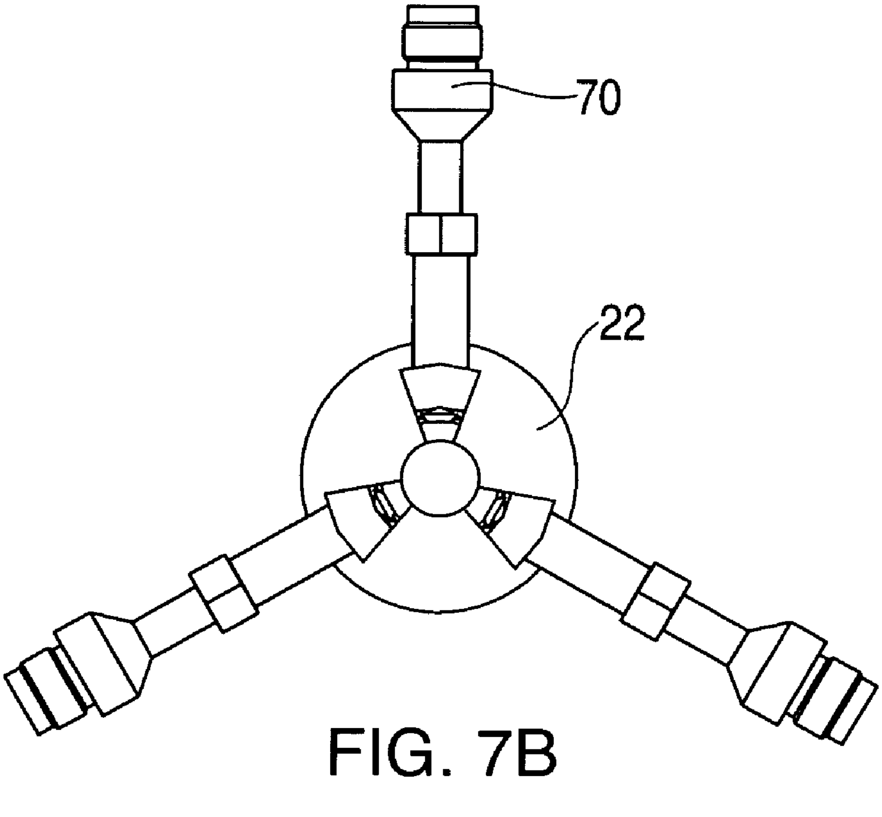

Turning to FIGS. 7A and 7B, there are shown side and top views, respectively, of an anode assembly 22 having radially fixed arc attachment points and fixed location powder injectors 70. Injectors 70 can be of conventional design and the anode can be designed to receive the powder injectors at fixed locations. Advantageously, because the fixed arc attachment points allow the powder injectors to also be fixed, the anode element and at least part of the powder injection ports can be comprised of an integral member. This ensures that the injectors are properly aligned and also reduces the number of components needed for the assembly.

Although the invention has been described with reference to the preferred embodiments thereof, it will be apparent to one skilled in the art that variations and modifications are contemplated within the spirit and scope of the invention. The drawings and description of the specific embodiments are made by way of example rather than to limit the scope of the invention, and it is intended to cover within the spirit and scope of the invention all such changes and modifications.

What is claimed is:

1. A plasma generator having a plasma channel therein extending along a central axis and comprising:

a plurality of cathodes positioned at a first end of the plasma channel and arranged radially about the axis;

an anode circuit positioned at a second end of the plasma channel, the anode element having a central bore herein and a plurality of arc attachment regions along a surface of the central bore, each attachment region corresponding to a respective cathode and configured to provide a substantially radially predefined attachment point for an electrical arc extending between the attachment region and the respective cathode wherein each arc attachment region comprises a respective discrete elevation of the surface of the central bore towards the central axis.

2. The plasma generator of claim 1, further comprising at least one gas inlet near the first end of the plasma channel through which gas can be injected into the channel.

3. The plasma generator of claim 1, wherein the surface of the central bore comprises tungsten.

4. The plasma generator of claim 3, wherein the central bore is defined by a tungsten sleeve contained within the anode element.

5. The plasma generator of claim 1, wherein the anode element is substantially comprised of a first electrically conductive material having a first thermal conductivity and the arc attachment regions comprise a second electrically conductive material having a second thermal conductivity less than the first thermal conductivity.

6. The plasma generator of claim 5, wherein the first electrically conductive material comprises copper and the second electrically conductive material comprises tungsten.

7. The plasma generator of claim 1, further comprising a plurality of powder injection ports arranged in a substantially fixed configuration with relation to the arc attachment regions.

8. The plasma generator of claim 7, wherein the anode element and at least part of the powder injection ports comprise an integral member.

9. The plasma generator of claim 1, wherein the arc attachment regions are within the central bore.

10. The plasma generator of claim 1, wherein the arc attachment regions are linear.

11. The plasma generator of claim 1, wherein the plurality of arcs pass through the central bore of the anode.

12. A plasma generator having a plasma channel therein extending along a central axis and comprising:

a plurality of cathodes positioned at a first end of the plasma channel and arranged radially about the axis;

an anode element positioned at a second end of the plasma channel, the anode element having a central bore therein and a plurality of arc attachment regions along a surface of the central bore, each attachment region corresponding to a respective cathode and configured to provide a substantially radially predefined attachment point for an electrical arc extending between the attachment region and the respective cathode;

wherein each arc attachment region comprises an elevation of the surface of the central bore towards the central axis; and wherein each elevation comprises a ridge having an upper surface relative to the central axis and at an angle thereto.

13. A plasma generator having a plasma channel therein extending along a central axis and comprising:

a plurality of cathodes positioned at a first end of the plasma channel and arranged radially about the axis;

an anode element positioned at a second end of the plasma channel, the anode element having a central bore therein and a plurality of arc attachment regions along a surface of the central bore, each attachment region corresponding to a respective cathode and configured to provide a substantially radially predefined attachment point for an electrical arc extending between the attachment region and the respective cathode;

wherein each arc attachment region comprises an elevation of the surface of the central bore towards the central axis; and wherein a contour of the central bore along a cross-section perpendicular to the central axis corresponds to an outer edge of a plurality of overlapping generally circular bodies arranged around the central axis.

14. The plasma generator of claim 13, wherein the circular bodies are arranged symmetrically around the central axis and have substantially equal diameters.

15. A plasma generator having a plasma channel therein extending along a central axis and comprising:

a plurality of cathodes positioned at a first end of the plasma channel and arranged radially about the axis;

an anode element positioned at a second end of the plasma channel, the anode element having a central bore therein and a plurality of arc attachment regions along a surface of the central bore, each attachment region corresponding to a respective cathode and configured to provide a substantially radially predefined attachment point for an electrical arc extending between the attachment region and the respective cathode;

wherein the anode element is substantially comprised of a first electrically conductive material having a first thermal conductivity and the arc attachment regions comprise a second electrically conductive material having a second thermal conductivity less than the first thermal conductivity; and wherein the arc attachment regions comprise axially elongated members mounted in the anode element.

16. The plasma generator of claim 15, wherein at least a portion of each member is exposed along the surface of the central bore, the exposed portions forming the arc attachment regions.

17. The plasma generator of claim 16, wherein the exposed portions are proud relative to adjacent areas of the surface of the central bore.

18. The plasma generator of claim 17, wherein the anode element is substantially comprised of copper and the members substantially comprise tungsten pins inserted into corresponding openings in the anode element.

19. A plasma generator having a plasma channel therein extending along a central axis and comprising:

a plurality of cathodes positioned at a first end of the plasma channel and arranged radially about the axis;

an anode element positioned at a second end of the plasma channel, the anode element having a central bore therein and a plurality of arc attachment regions along a surface of the central bore, each attachment region corresponding to a respective cathode and configured to provide a substantially radially predefined attachment point for an electrical arc extending between the attachment region and the respective cathode, the anode element having a plurality of cooling channels therein, the arc attachment regions being defined by differences in the capacity of the cooling channels to remove heat from regions of the anode element adjacent the central bore, wherein the cooling channels are configured to remove heat from the arc attachment regions at a first rate and to remove heat from regions adjacent the arc attachment regions and the central bore at a second rate greater than the first rate;

wherein the arc attachment regions will be cooled more slowly than the adjacent regions.

20. An anode element for use in a plasma generator having a plurality of cathodes comprising;

an electrically conductive body having a central bore therein defining a central axis and a plurality of arc attachment regions arranged along a surface of the central bore, each attachment region providing a substantially radially predefined attachment point for an electrical arc extending between the attachment region and a respective cathode when the anode nozzle element is used in the plasma generator and sufficient current is applied across the anode element and the plurality of cathodes, wherein each arc attachment region comprises a respective discrete elevation of the surface of the central bore towards the central axis.

21. The anode element of claim 20, wherein the surface of the central bore comprises tungsten.

22. The anode element of claim 21, wherein the central bore is defined by a tungsten sleeve contained with the body.

23. The anode element of claim 20, wherein the body comprises a first electrically conductive material having a first thermal conductivity and wherein the arc attachment regions comprise a second electrically conductive material having a second thermal conductivity less than the first thermal conductivity.

24. The anode element of claim 23, wherein the first electrically conductive material comprises copper and the second electrically conductive material comprises tungsten.

25. The anode element of claim 20, further comprising a plurality of cooling channels therein, the cooling channels configured to allow a coolant to remove heat from the arc attachment regions at a first rate and to remove heat from regions adjacent the arc attachment regions at a rate greater than the first rate;

wherein the arc attachment regions will be cooled more slowly than the adjacent regions.

26. The anode element of claim 20, further comprising a plurality of powder injection ports arranged in a substantially fixed configuration with relation to the arc attachment regions.

27. The anode element of claim 26, wherein the anode element comprises an integral member.

28. The plasma generator of claim 20, wherein the arc attachment regions are within the central bore.

29. The plasma generator of claim 20, wherein the arc attachment regions are linear.

30. An anode element for use in a plasma generator having a plurality of cathodes comprising;

an electrically conductive body having a central bore therein and a plurality of arc attachment regions arranged along a surface of the central bore, each attachment region providing a substantially radially predefined attachment point for an electrical arc extending between the attachment region and a respective cathode when the anode nozzle element is used in the plasma generator and sufficient current is applied across the anode element and the plurality of cathodes;

wherein each arc attachment region comprises an elevation of the surface of the central bore towards the central axis; and wherein each elevation comprises a ridge having an upper surface relative to the central axis and at an angle thereto.

31. An anode element for use in a plasma generator having a plurality of cathodes comprising;

an electrically conductive body having a central bore therein and a plurality of arc attachment regions arranged along a surface of the central bore, each attachment region providing a substantially radially predefined attachment point for an electrical arc extending between the attachment region and a respective cathode when the anode nozzle element is used in the plasma generator and sufficient current is applied across the anode element and the plurality of cathodes;

wherein each arc attachment region comprises an elevation of the surface of the central bore towards the central axis; and wherein a contour of the central bore along a cross-section perpendicular to the central axis corresponds to an outer edge of a plurality of overlapping generally circular shapes arranged around the central axis.

32. The anode element of claim 31, wherein the circular shapes are arranged symmetrically around the central axis and have substantially equal diameters.

33. An anode element for use in a plasma generator having a plurality of cathodes comprising;

an electrically conductive body having a central bore therein and a plurality of arc attachment regions arranged along a surface of the central bore, each attachment region providing a substantially radially predefined attachment point for an electrical arc extending between the attachment region and a respective cathode when the anode nozzle element is used in the plasma generator and sufficient current is applied across the anode element and the plurality of cathodes;

wherein the body comprises a first electrically conductive material having a first thermal conductivity and wherein the arc attachment regions comprise a second electrically conductive material having a second thermal conductivity less than the first thermal conductivity; and wherein the arc attachment regions comprise axially elongated members mounted at least partially within the body.

34. The anode element of claim 33, wherein at least a portion of each member is exposed along the surface of the central bore, the exposed portions forming the arc attachment regions.

35. The anode element of claim 34, wherein the exposed portions are proud relative to adjacent areas of the surface of the central bore.

36. The anode element of claim 35, wherein the body is substantially comprised of copper and the members substantially comprise tungsten pins inserted into corresponding openings in the body.

* * * * *

UNITED STATES PATENT AND TRADEMARK OFFICE
CERTIFICATE OF CORRECTION

PATENT NO. : 7,030,336 B1

APPLICATION NO. : 10/731986
DATED : April 18, 2006
INVENTOR(S) : David Hawley

It is certified that error appears in the above-identified patent and that said Letters Patent is hereby corrected as shown below:

Title Page, (21): “10/731,9864” should read --10/731,986--.

Column 6, line 15: “circuit” should read --element--.

Column 6, line 16: “herein” should read --therein--.

Signed and Sealed this

First Day of August, 2006

JON W. DUDAS
*Director of the United States Patent and Trademark Office*